(12) United States Patent
Cross et al.

(10) Patent No.: US 9,515,333 B1
(45) Date of Patent: Dec. 6, 2016

(54) FLOW MANAGEMENT IN FUEL CELL CONFIGURATIONS

(75) Inventors: Tsali Cross, Bothell, WA (US); Derek Reiman, Bothell, WA (US); Matthew Carson, Bothell, WA (US); Joseph Schmeller, Bothell, WA (US)

(73) Assignee: NEAH POWER SYSTEMS, INC., Bothell, WA (US)

( * ) Notice: Subject to any disclaimer, the term of this patent is extended or adjusted under 35 U.S.C. 154(b) by 46 days.

(21) Appl. No.: 13/111,961

(22) Filed: May 20, 2011

Related U.S. Application Data

(60) Provisional application No. 61/346,887, filed on May 20, 2010.

(51) Int. Cl.
*H01M 8/04* (2016.01)

(52) U.S. Cl.
CPC ..... *H01M 8/04208* (2013.01); *H01M 8/04753* (2013.01)

(58) Field of Classification Search
CPC ....................................................... H01M 8/04
USPC ........................................ 429/410, 423, 417
See application file for complete search history.

(56) References Cited

U.S. PATENT DOCUMENTS

| | | | |
|---|---|---|---|
| 2003/0178305 A1* | 9/2003 | Catalano et al. | 204/433 |
| 2005/0084738 A1 | 4/2005 | Ohlsen | |
| 2006/0201814 A1* | 9/2006 | Hafezi et al. | 205/102 |
| 2009/0023036 A1 | 1/2009 | Liu | |
| 2010/0233563 A1* | 9/2010 | Katano et al. | 429/446 |

FOREIGN PATENT DOCUMENTS

| | | | |
|---|---|---|---|
| WO | WO 2004004611 | * | 1/2004 |
| WO | WO 2008/015896 | * | 2/2008 |

* cited by examiner

*Primary Examiner* — Patrick Ryan
*Assistant Examiner* — Alex Usyatinsky

(57) ABSTRACT

A fluid resistance section outside a fuel cell can regulate the reactant flow against the pressure changes in the reaction zones of the electrodes, reducing the fluctuations in reactant flows to the fuel cell electrodes due to dynamic fluctuations in fluid pressure at the fuel cell electrode because of the release of gaseous products. The outside fluidic resistor can have resistance much higher than the resistance of the flow through the electrodes, thus effectively determining the amount of the reactant flow to the electrodes, independent of the electrode areas.

18 Claims, 15 Drawing Sheets

FLOW MANAGEMENT IN FUEL CELL CONFIGURATIONS

This application claims priority from U.S. provisional patent application Ser. No. 61/346,887, filed on May 20, 2010, entitled "Flow management in fuel cell configurations", which is incorporated herein by reference.

FIELD OF THE INVENTION

The present invention relates generally to fuel cell systems and, more specifically, to microfluidic fuel cell systems.

BACKGROUND OF THE INVENTION

A fuel cell is an energy conversion device that consists essentially of two opposing electrodes, an anode and a cathode, ionically connected together via an interposing electrolyte. Unlike a battery, fuel cell reactants are supplied from an external reactant supply source. Fuel cells operate by converting a reactant fuel such as hydrogen or a hydrocarbon (e.g., methanol) to electrical power through an electrochemical process rather than by combustion. It does so by harnessing the electrons released from controlled oxidation-reduction reactions occurring on the surface of a catalyst. A fuel cell can produce electricity continuously so long as proper reactants (i.e., a fuel and an oxidant) are supplied from an outside source.

Most conventional micro-scale fuel cell systems include a stack of electrically interconnected electrode pair assemblies (commonly referred to as a fuel cell stack assembly), wherein each electrode pair is configured to receive and react with selected reactants (e.g., methanol and air flowstreams delivered across respective outer electrode surfaces). The interposing electrolyte of most conventional micro-scale liquid-air fuel cell systems (e.g., direct methanol fuel cell (DMFC) systems) generally consist of a solid polymer proton exchange membrane (PEM) (e.g., NAFION). These known micro-scale fuel cell systems all comprise an interconnected series of electrode pair assemblies, wherein each electrode pair utilizes a solid polymer proton exchange membrane as a separator and as a proton ($H^+$) transfer medium.

In contrast, certain liquid-liquid fuel cell systems do not utilize a central PEM. In general, liquid-liquid fuel cell systems typically comprise electrode pairs and related stack assemblies that include a series of micro fluidic flow channels for flowing liquid reactant/electrolyte flowstreams (i.e., electrolytic fuel and oxidant flowstreams referred to herein as anolyte and catholyte flowstreams, respectively) adjacent to and/or through discrete regions of accompanying porous electrode structures.

SUMMARY OF THE DESCRIPTION

The present invention relates to the management of fluid reactant flows in fuel cells, such as fuel flowstream in PEM fuel cells, or fuel flowstream and/or oxidant flowstream in liquid-liquid fuel cells. In an embodiment, the present invention discloses methods and apparatuses for reducing fluctuations in reactant flows to the fuel cell electrodes, for example, due to dynamic fluctuations in fluid pressure at the fuel cell electrode because of the release of gaseous products.

Microchannel structure can improve fuel cell efficiency with increased surface areas, but introducing high pressure fluctuations as the results of the released gaseous products such as $CO_2$. High pressure can affect the reactant flow, either blocking or reducing the reactant flow, which then reduces the power generation. In an embodiment, the present invention provides a fluid resistance section outside the electrodes to regulate the reactant flow against the pressure changes in the reaction zones of the electrodes. The outside fluidic resistor can have resistance much higher than the resistance of the flow through the electrodes, thus effectively determining the amount of the reactant flow to the electrodes, independent of the electrode areas.

In an embodiment, the present fluidic resistor comprises microchannel sections having fluid resistance or pressure drop that is greater than the fluid resistance or pressure drop across the electrode. The microchannel sections are coupled to the entrance and/or outlet of the fuel cell, regulating the reactant flow to the fuel cell. In an embodiment, the microchannels can be integrated to the fuel cell fluid flow portions, creating an integrated fuel system with improved reactant flows.

In an embodiment, the present invention discloses the use of microchannels to control fluid delivery to a multitude of fuel cells arranged in parallel configurations. This allows the use of a single pump to deliver fuel to many cells and flow rates to individual cells which is dominated by channel width and length, making fuel delivery impervious to dynamic changes in pressure of the fuel cell. Microchannels may be made by semiconductor processing, MEMS processing, stamping, etc. that can be integrated easily with the fuel cells.

BRIEF DESCRIPTION OF THE DRAWINGS

FIG. 7A shows a cross section view and FIG. 7B shows a perspective view of a fluidic resistor.

FIG. 9A shows a top view of an exemplary serpentine pattern. FIG. 9B shows a cross section view of an exemplary serpentine pattern. FIG. 9C shows two flow controller layers.

DETAILED DESCRIPTION OF THE PREFERRED EMBODIMENTS

The present invention relates to power management in fuel cell systems, and particularly to fuel cell systems employing microchannel structures. In an embodiment, the present invention discloses a fuel cell system having improved operating power characteristics, such as reducing fluctuations in fuel cell power generation, preventing intermittent power interruption, and in general, enabling a fuel cell system to generate a steady and reliable power output.

In an embodiment, the present invention discloses a liquid flow management for fuel cell reactants together with integrated fuel cell systems employing liquid flow management. The present liquid flow management controls the reactant flows to the fuel cell electrodes to improve the operation characteristics of fuel cell systems.

In an embodiment, the present liquid flow management supplies an improved reactant flow to the electrodes, which is less susceptible to changes in the fuel cell operation behaviors, such as changes in fluidic resistance at the electrode areas due to gaseous formation at the electrode microchannel structures. In an embodiment, the present liquid flow management supplies a steady reactant flow to the fuel cell electrodes to meet a power generation requirement. The term "steady flow" denotes a desirable characteristic of the reactant flow to the electrode, and in the context of the present specification, means a constant flow, a nearly constant flow, a substantially constant flow, an improved constant flow, a flow that has improved constancy characteristics, and in general, a flow that is less susceptible to changes, such as changes in fuel cell operating and environment conditions, changes in fuel cell operation behaviors, changes in fuel cell reaction characteristics, and changes in fuel cell manufacturing processes.

In an embodiment, the present liquid flow management employs channel length and pressure drop optimization to reduce or eliminate the dynamic pressure fluctuation in fuel cell reaction chamber, and/or the variations in electrode manufacturing. For example, by supplying a steady reactant flow, the dynamic fluidic resistance fluctuation can be compensated, resulting in steady power generation.

The present invention can be used in fuel cell systems that employ liquid reactant flowstreams in separate electrochemical half-cell reactions, such as conventional PEM-based fuel cell systems, together with novel electrode pair assemblies that do not include an interposing solid polymer proton exchange membrane where the liquid anolyte flowstream functions as the interposing electrolyte.

Figure 1:
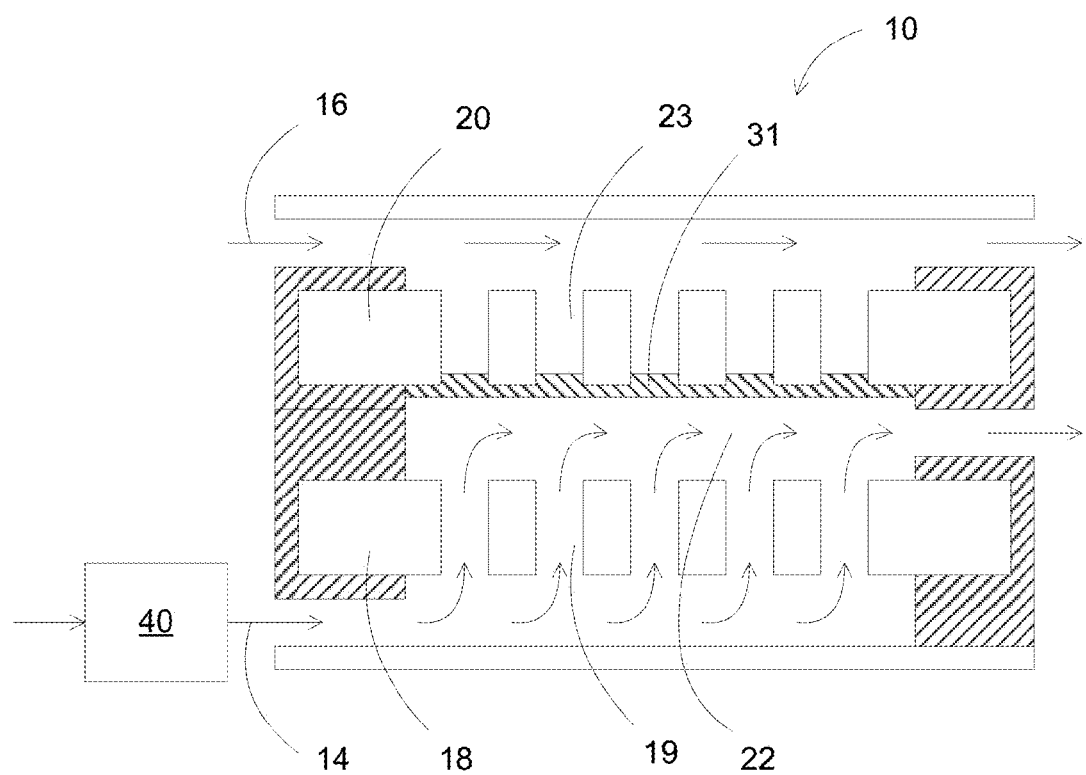
FIG. 1 illustrates an exemplary fuel system comprising a flow management according to embodiments of the present invention.

FIG. 1 illustrates an exemplary fuel system 10 comprising a flow management according to embodiments of the present invention. The fuel system 10 comprises a flow management 40 supplying a steady anolyte flowstream 14 to a fuel cell. The fuel cell comprises an electrode pair assembly (anode 18 and cathode 20), configured to receive and react with a liquid anolyte flowstream 14 and a liquid catholyte flowstream 16. The electrode pair assembly comprises a porous flow-through anode 18, a porous flow-by cathode 20 confronting and spaced apart from the anode 18, and a central plenum 22 interposed between and connected to the anode and the cathode. The electrode pair assembly further comprises a catalyzed separator 31 to prevent the catholyte flowstream 16 from substantially passing through the flow-by cathode 20 and into the central plenum 22. In an embodiment, the liquid anolyte flowstream comprises a laminarly microfluidic flowing methanol/sulfuric acid solution, and the liquid catholyte flowstream comprises a laminarly microfluidic flowing nitric acid/sulfuric acid solution.

For purposes of illustration and not limitation, the present invention is described herein in the context of a methanol-nitric acid fuel cell system having flow-through anode and flow-by cathode, similar to the fuel cell systems described in application Ser. No. 11/669,895, entitled "Liquid-liquid fuel cell systems having flow-through anodes and flow-by cathodes", having a common assignee, hereby incorporated by reference. However, other fuel cell systems are possible and within the scope of the present invention, such as other methanol-nitric acid fuel cell system having different configurations, for example, flow-through anode and flow-through cathode fuel cell system of application Ser. No. 10/966,721, entitled "Nitric acid fuel regeneration fuel cell system", having a common assignee, hereby incorporated by reference. In addition, other liquid fuel and/or liquid oxidant combinations, such as direct methanol liquid/air or methanol/water systems, are also possible and within the scope of the present invention.

In an embodiment, the dimensions of the electrode pair assemblies, central plenums 22, and anolyte/catholyte flow channels (delivery and removal) are generally configured such that the fuel cell system 10 is considered to be a microfluidic device, generally referring to an article of manufacture that has one or more flow channels or plenums with at least one dimension less than about 2 millimeters (2 mm).

Thus, typical widths and heights associated with the microfluidic plenums and flow channels generally range from about 10 to about 10,000 μm, preferably from about 50 to about 5,000 μm, and even more preferably from about 100 to about 1,000 μm. In some preferred embodiments, the anode and cathode are confronting and spaced apart a distance of about 50 microns to about 3 millimeters, and more preferably from about 100 microns to about 1 millimeter. As used herein, the term "plenum" means a chamber or compartment such as the spaced apart region between the confronting electrodes disclosed herein, whereas the term "channel" means an enclosed elongated groove or furrow.

The anode 18 and cathode 20 generally have one or more discrete porous regions with a plurality of spaced apart flow-through anode pores 19 and flow-by cathode pores 23. The porous regions can comprise a plurality of acicular or columnar pores (e.g., passageways) that extend through the substrate with average diameter ranging from about 0.2 to about 200 microns. The pores might be microporous (e.g., average pore size <2 nm), mesoporous (e.g., average pore size of 2 nm to 50 nm), or macroporous (e.g., average pore size >50 nm), with regularly spaced apart from one another a distance ranging from about 1 μm to about 20 μm, resulting in aspect ratios greater than 5:1.

The illustrated fuel cell is a methanol-nitric acid fuel cell that does not include a conventional interposing solid polymer proton exchange membrane, but employs a liquid anolyte flowstream 14 (having an acidic electrolyte component such as $H_2SO_4$ or triflic acid) functioning as the interposing electrolyte. In this configuration, protons ($H^+$) liberated at the anode 18 are able to migrate through the interposing flowing liquid anolyte flowstream 14 across the central plenum 22 and the catalyzed separation layer 31 to reach and react with oxidant at the opposing cathode 20 to yield reaction products. In the context of a direct methanol-nitric acid fuel cell system, the electrochemical reactions occurring are believed to be essentially as follows:

Anode: $CH_3OH+H_2O \rightarrow 6H^+ + 6e^- + CO_2$ (1)

Cathode: $2HNO_3 + 6H^+ + 6e^- \rightarrow 2NO + 4H_2O$ (2)

Net: $CH_3OH + 2HNO_3 \rightarrow 2NO + 3H_2O + CO_2$ (3)

The fuel for reacting at the electrodes yields reaction products that include a gaseous component, such as carbon dioxide in an anolyte effluent flowstream or nitric oxide (NO, or nitrogen monoxide). The formation of $CO_2$ gas inside the fuel cell can result in an increase in the pressure inside the fuel cell and thereby may cause substantial problems such as, e.g., impeding the reactant fluid flow and reducing the power generation of the fuel cell. Under some operating conditions, for example, enough $CO_2$ can be created at the porous and microchannel anode electrode to create a pressure build-up at the electrode so that the methanol flow can stop, causing the fuel cell to cease functioning. In general, the bubbles are dynamically generated at the electrode and swept to the output of the fuel cell, creating a dynamic pressure fluctuation at the electrodes. This dynamic pressure fluctuation, in turn, creates a dynamic reactant flow fluctuation, for example, the reactant flow to the electrode intermittently turns off due to the pressure build-up in the fuel cell, resulting in a power generation fluctuation at the output of the fuel cell. In addition, variations in porous and microchannel electrodes can result in minor differences in fluidic resistance between parallel cells, creating variations in power generation from fuel cell to fuel cell.

In an embodiment, the present flow management 40 manages the anode flowstream 14 to reduce and/or eliminate the dynamic pressure fluctuation in fuel cell systems and/or the variations in electrode manufacturing. For example, the flow management 40 can supply a steady flow to the anode, regardless of the dynamic pressure build-up due to the bubble formation at microchannel structures.

The anode flowstream 14 passing through the anode electrode 18 can exhibit a fluidic resistance R1, characterizing the fluid flow rate Qv through the anode area given a pressure difference $\Delta P$ ($R1 = \Delta P/Qv$). Under operations, the resistance R1 is dynamic, comprising an intrinsic resistance and a variable resistance. The intrinsic resistance is primarily a function of geometry, such as the porous and microchannel structures. For example, the electrodes can be coated with a bubble repelling surface, or a hydrophilic microporous layer to assist in transporting gaseous products out of the fuel cell electrode areas, reducing the fluidic resistance.

The variable resistance is typically a function of the fuel cell operating behavior, such as the reaction of the anolyte at the anode surface. For example, the resistance can fluctuate, increasing significantly from the intrinsic resistance value when gaseous products are formed and blocking the fluid pathway and dropping back to the intrinsic level after the bubbles are swept away to the outlet. This dynamic resistance fluctuation causes fluctuation in reactant flow rate, resulting in fluctuation in power generation of the fuel cell. In worst case scenarios, the fuel can turn off intermittently when the reactant flow rate drops below a minimum level.

In an embodiment, the flow management 40 comprises a flow controller designed to provide a steady flow Qv to the fuel cell electrode, regardless of the dynamic fluctuation in fuel cell resistance. In addition, the flow management 40 can supply a constant flow Qv to achieve consistent power outputs regardless of variations in fuel cell manufacturing processes. For example, the flow controller can comprise a constant flow source for supplying a constant flow, a feedback mechanism to maintain a constant flow, e.g., increasing an input pressure when the flow reduces and reducing the input pressure when the flow returns to its nominal value. Alternatively, the flow controller can comprise a damping component, effectively reducing the dependence of the flow on the fuel cell pressure.

In an embodiment, the flow controller can comprise active components, such as a variable fluidic resistance component, a feedback mechanism, monitoring the flow and adjusting a series resistance or input pressure to ensure a constant flow. Alternatively, the flow controller can comprise passive components, such as a constant fluidic resistance to improve the constancy of the reactant flow, or to reduce the susceptibility of the reactant flow to the pressure fluctuation.

In an embodiment, the flow controller comprises a constant fluidic resistor with resistance sufficient to overcome the fluctuations in fuel cell chamber pressure. The constant resistance provides ease of fabrication and simplicity, which can offer high fuel cell reliability. For example, the constant resistance can be similar, higher or much higher than the resistance of the fuel cell electrode. With a constant resistance connected in series with the fuel cell, the reactant flow Qv through the electrode of the fuel cell is $\Delta P/(R2+R1)$, with $\Delta P$ being the total pressure drop across the flow controller ($\Delta P2$) and across the fuel cell ($\Delta P1$), and R1 and R2 being the fluidic resistance of the fuel cell and the flow controller, respectively. Thus for a similar resistance configuration (e.g., R2~R1), the flow controller can reduce the fluctuation in fuel cell flow by a factor of two.

In an embodiment, with the resistance of the flow controller much higher than the resistance of the fuel cell (R2>>R1), the reactant flow can be estimated as $\Delta P/R2$, which is independent of the fuel cell, thus providing a substantially constant flow to the fuel cell, regardless of changes in operating conditions, reaction mechanism or manufacturing variations. In an embodiment, the resistance of the flow controller is 2 to 5 times larger, 5 to 10 times larger, or even 10-100 times larger than the resistance of the fuel cell. In an embodiment, the resistance of the flow controller is between 10 to 30 times the fluidic resistance of the fuel cell. To maintain a desired reactant flow with the addition of the flow controller series resistors, the pressure drop across the system increases proportionally, with higher controller resistance requiring higher pressure drop. Thus, in an embodiment, the controller resistance is chosen to suit an optimum pressure drop of the fuel cell system. In an embodiment, the pressure drop for the fuel cell system is 5-15 psi, for fuel cell electrode configurations that exhibit 0-1 psi pressure drop.

In an embodiment, the reactant flow through the electrodes is between 0.05 to 100 ml/min, resulting in a pressure drop across the electrode of typically less than 0.4 psi with microchannel and porous electrodes. Thus the fluidic resistance is typically between roughly $4 \times 10^{-3}$ to 4 psi/mlpm. A typical anolyte flowstream generally has a flow rate ranging from about 0.3 ml/min to about 3 ml/min, thus for a 1 ml per minute flow rate, the fluidic resistance is about 0.4 psi/mlpm. In the present description, the fluidic resistance can also be characterized by the pressure difference $\Delta P$, since these values are proportional to each other, with a factor of the fluid flow Qv.

Figure 2A:
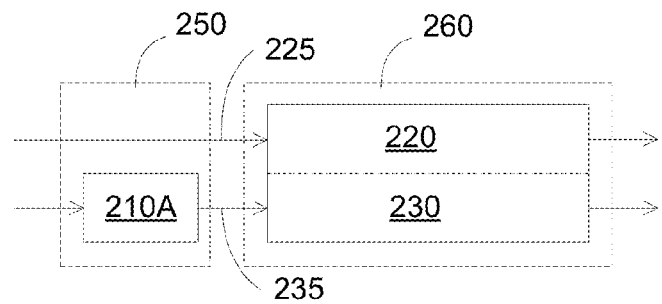
FIGS. 2A-2D illustrate various configurations for connecting a flow management with a fuel cell.
Figure 2B:
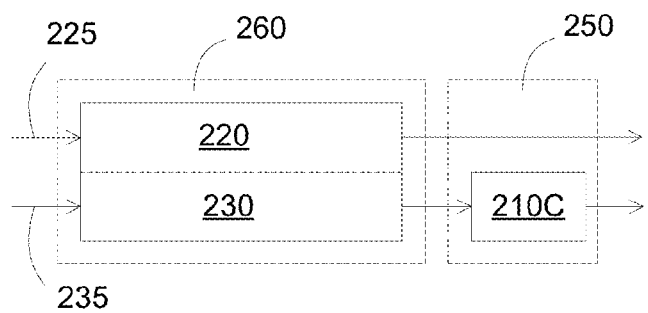
Figure 2C:
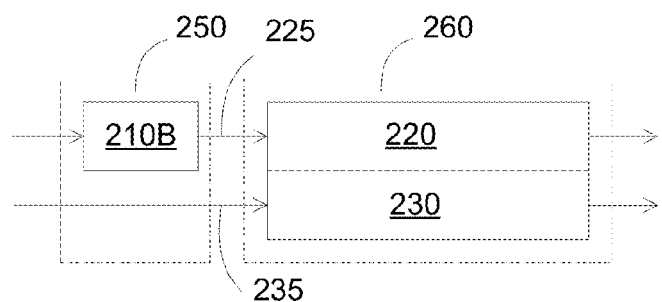
Figure 2D:
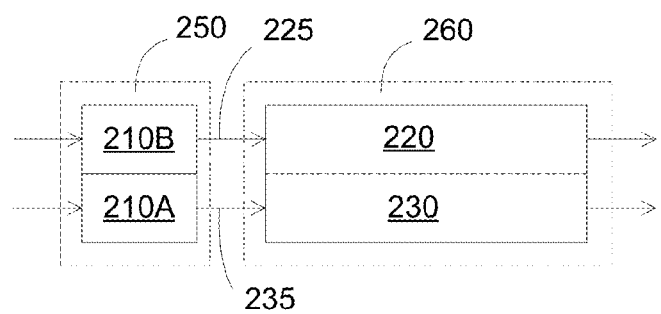

The flow management 40 is shown to be fluidly connected in series at the inlet of the anode flowstream 14 in the fuel cell system 10. However, the invention is not so limited, and the flow management can be connected at the outlet of the fuel cell. In addition, the flow management can be connected to the cathode flowstream, or connected to both anode and cathode flow streams. FIGS. 2A-2D illustrate various configurations for connecting a flow management 250 with a fuel cell 260, including connecting a flow controller 210A in series with the inlet of an electrode 230 (e.g., an anode electrode) to provide a steady flow stream 235 (FIG. 2A), connecting a flow controller 210C in series with the outlet of an electrode 230 to provide a steady flow stream 235 (FIG. 2B), connecting a flow controller 210B in series with the inlet of another electrode 220 (e.g., a cathode electrode) to provide a steady flow stream 225 (FIG. 2C), or connecting flow controllers 210A/210B in series with the inlets of both electrodes 220/230 respectively to provide both steady flow streams 225/235 (FIG. 2D). Other configuration variations are within the scope of the present invention, for example, connecting two flow controllers to the outlets of the anode/cathode, or connecting a flow controller to the outlet of the cathode 220. Alternatively, the flow management can be connected in parallel with the fuel cell, creating a bypass flow for the reactant to compensate for the increase in fuel cell resistance. The outlets of the flow management and the fuel cell can be connected or separated, for example, returning the un-reacted reactant flow at the outlet of the flow controller to the fuel reservoir and directing the reacted reactant flow at the outlet of the fuel cell to the waste container.

Figure 3:
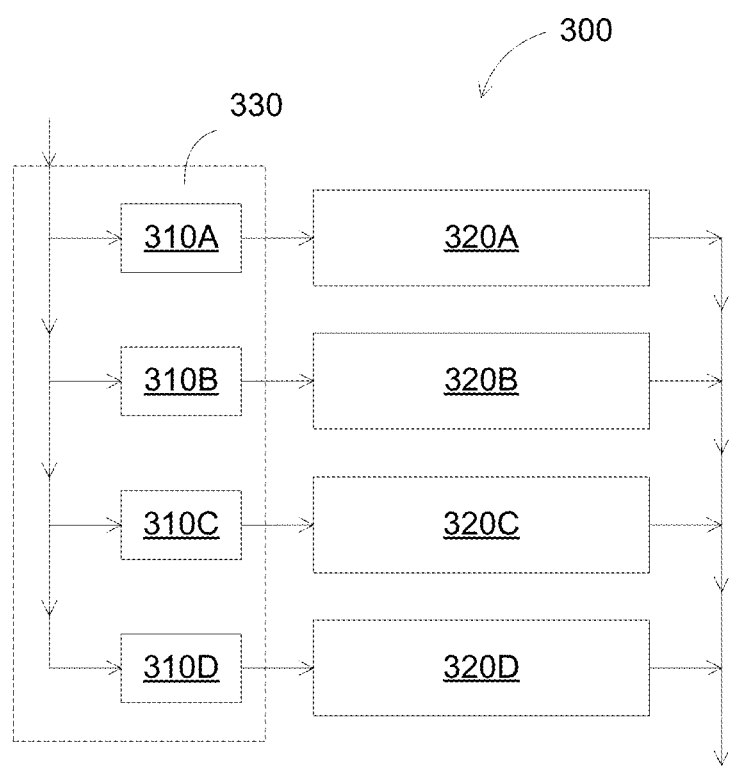
FIG. 3 illustrates a schematic configuration for a fuel cell system according to an embodiment of the present invention.

For multiple fuel cell configurations, each electrode can have its own flow controller, multiple electrodes (having the same reactant) can share a flow controller, or some electrodes do not require any flow controller. FIG. 3 illustrates a schematic configuration for a fuel cell system 300 according to an embodiment of the present invention, comprising multiple fuel cells 320A-320D and a flow management system 330. The flow management system 330 comprises multiple flow controllers 310A-310D connected to the fuel cells 320A-320D, with each flow controller controlling a fuel cell in series at the inlet. Alternatively, the flow controllers can be connected at the outlets of the fuel cells, or one flow controller can control two or more fuel cells. As shown, a flow controller, e.g., one of the pluralities of flow controllers 310A-310D, is connected to one fuel cell, e.g., one of the pluralities of fuel cells 320A-320D. This configuration can represent any of the configurations shown in FIG. 2, meaning the flow controller 310A can control the anode flowstream, the cathode flowstream, or both anode and cathode flowstreams, at the inlets or outlets of the fuel cells.

In an embodiment, the fluidic resistor can be fabricated through various restriction configurations in the fluid transport paths. Examples of the fluidic resistors includes long winding pattern, capillary tube, or porous restrictor elements such as porous materials, wicking fiber, packed bed filler materials, porous dense filter papers.

Figure 4A:
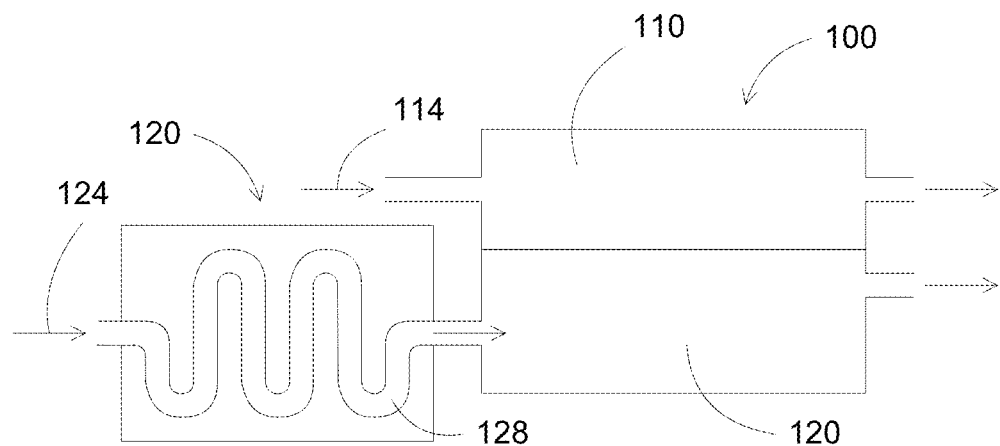
FIGS. 4A-4B illustrate exemplary fluidic resistors having a long winding pattern according to an embodiment of the present invention.
Figure 4B:
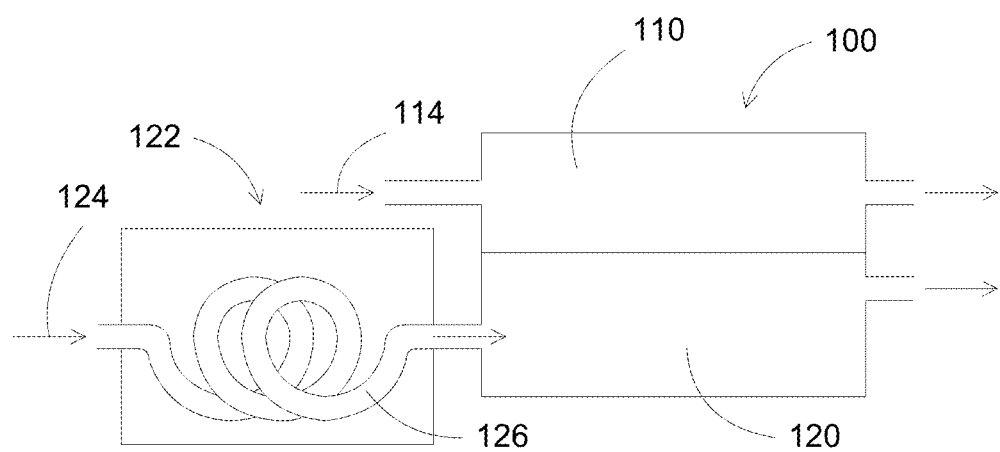

FIGS. 4A-4B illustrate exemplary fluidic resistors having a long winding pattern according to an embodiment of the present invention. A fuel cell 100 comprises electrodes 110 and 120, each with reactant flow streams 114 and 124, respectively. A flow controller 120/122 regulates reactant flow 124 to the fuel cell 100. As shown, the flow controller 120/122 regulates the inlet reactant flow to electrode 120, however, alternative configurations exist, such as the configuration described above.

The flow controller 120 and 122 comprises a fluidic resistor having a serpentine pattern 128 and a circular wrap-around pattern 126. The fluidic resistance is a function of the length of the long winding resistor. The cross section of the fluid flow can be similar to the inlet of the fuel cell, or can be larger or smaller, to provide a desired fluidic resistance to the flow controller 120.

Figure 5A:
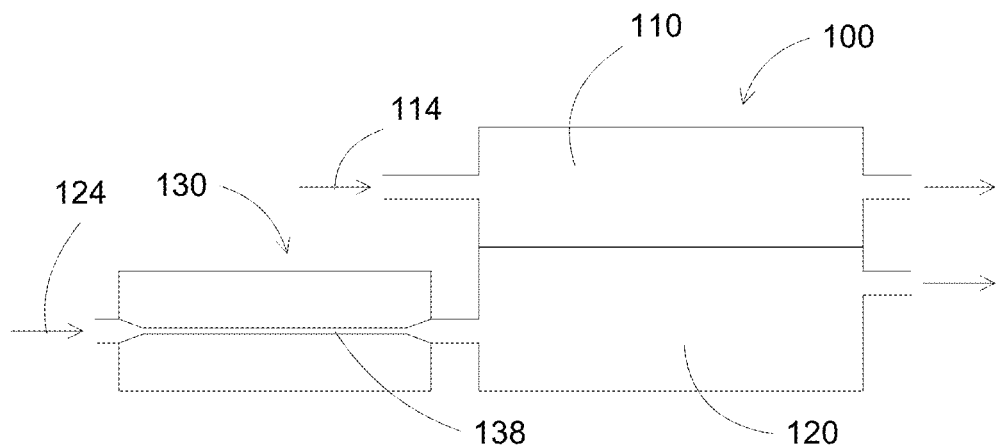
FIGS. 5A-5B illustrate exemplary fluidic resistors having a capillary tube according to an embodiment of the present invention.
Figure 5B:
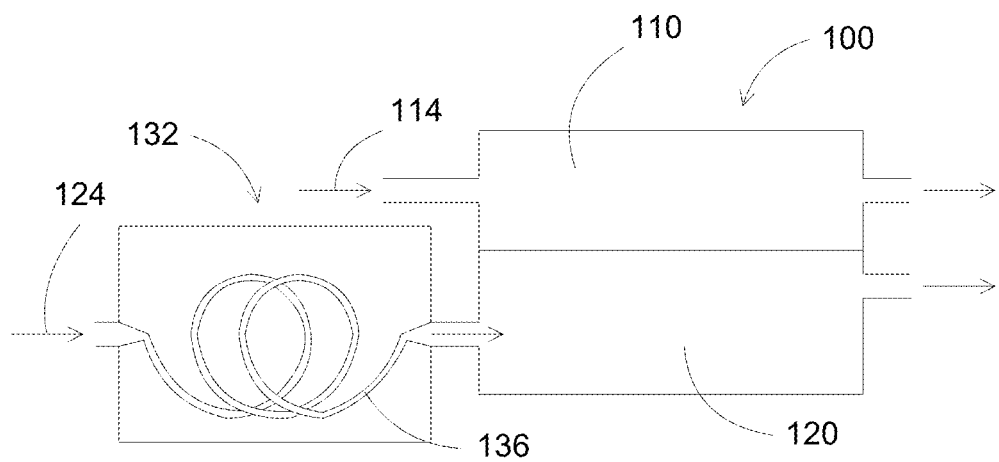

FIGS. 5A-5B illustrate exemplary fluidic resistors having a capillary tube according to an embodiment of the present invention. Capillary resistors may be inserted into a fluidic manifold with single inlet and outlet to deliver liquid to individual cells. Also, a bank of fluidic resistors can be integrated into a manifold with single fluid inputs and outputs. The capillary tubes can be coated with a surface tension reduction coating to reduce clogging failure due to bubbles affected by high surface tension within narrow tubes and shut off access to fluid flow.

The flow controller 130 and 132 comprises a fluidic resistor having a straight capillary tube 138 and a circular wrap-around capillary tube 136, respectively. Pressure drop or fluidic resistance may be calculated via Bernoulli's equation where $\Delta P$ is a function of capillary diameter, fluid velocity, fluid length, and viscosity. Compatible capillary resistor materials may include, but are not limited to, PVDF, HDPE, Teflon, fluorine-silicone based polymers (e.g., Hubtron).

Figure 6A:
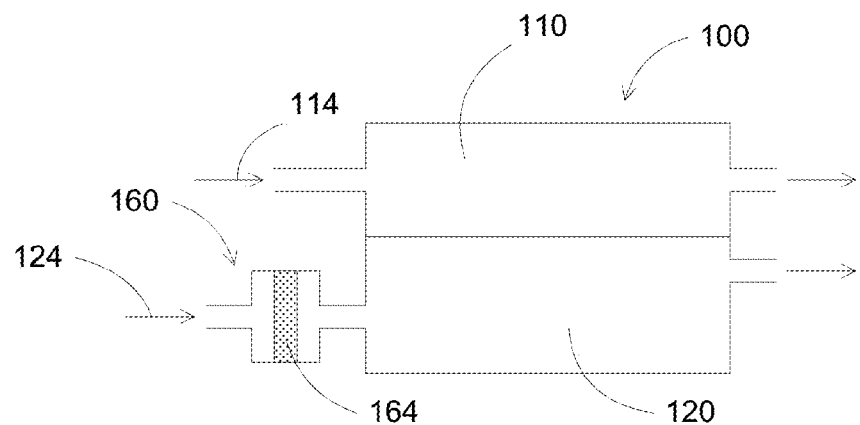
FIGS. 6A-6C illustrate exemplary fluidic resistors having porous elements within the flow path according to an embodiment of the present invention.
Figure 6B:
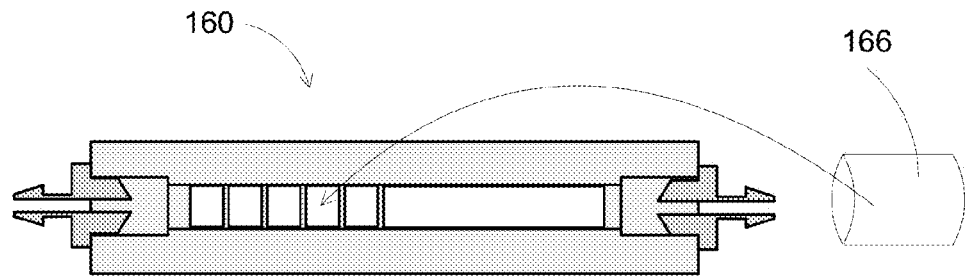
Figure 6C:
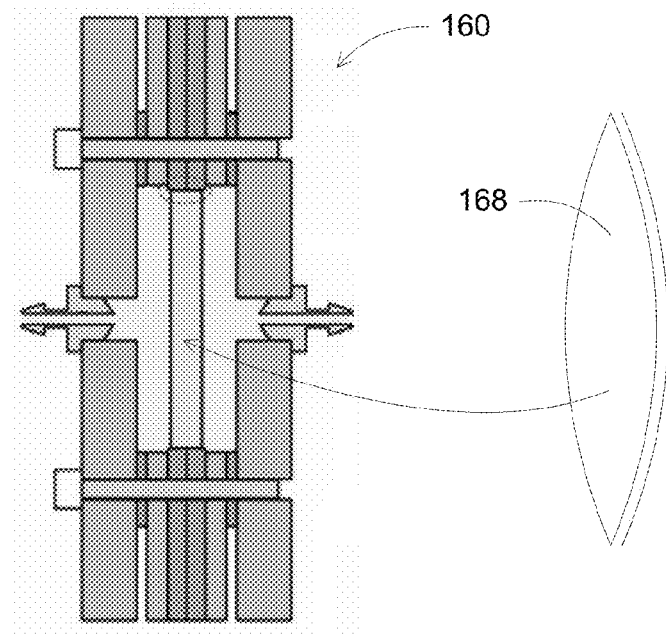

FIGS. 6A-6C illustrate exemplary fluidic resistors having porous elements within the flow path according to an embodiment of the present invention. In an embodiment, the porous elements can be porous plugs disposed within a tube, a porous disk or plate on the path of the liquid flow or integrated immediately near the fuel cell, wicking fiber such as $SiO_2$ glass wool, packed bed filler materials, porous dense filter paper(s) or other phyllic or wicking material stuffed inside the flow path. In general, porous elements may be inserted into a body with single inlet and outlet to deliver reactant liquid to individual cells. The porous body can provide reduced surface tension for incoming fluid, by their hydrophilic nature, such that bubbles do not effect operation of fluidic resistors. In addition, the porous resistor can use phyllic or other wicking materials which can reduce or eliminate surface tension failure. This is opposed to capillary resistors where bubbles can be affected by high surface tension within narrow tubes. A porous resistor embodiment may also include a plate with micro machined pores that can be integrated with reactant flow of a fuel cell to provide fluidic resistance. Compatible resistor materials may include $SiO_2$, Ta, Carbon, W, PVDF, HDPE, and Teflon.

The flow controller 160 comprises a fluidic resistor having a porous element 164, 166 or 168. The porous element provides fluidic resistance to the incoming liquid flow 124 with the resistance being a function of the diameter, length, and pore characteristics of the porous element. The porous element can be in the form of porous cylinder 166, installed in a tube, to which a number of porous cylinders can be added or removed to change the fluidic resistance of the flow controller 160. The porous element can be in the form of porous disk or plate 168.

Figure 7A:
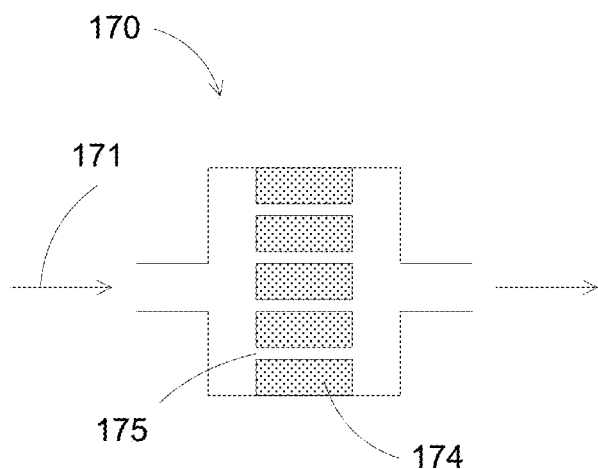
FIGS. 7A-7B illustrate exemplary fluidic resistors having multiple holes within a blocking element within the flow path according to an embodiment of the present invention.
Figure 7B:
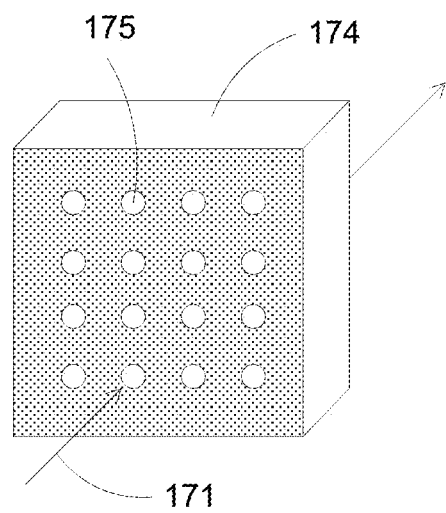

FIGS. 7A-7B illustrate exemplary fluidic resistors having multiple holes within a blocking element within the flow path according to an embodiment of the present invention. The flow controller 170 comprises a fluidic resistor 174 having a plurality of pass-through holes 175, which size and density can determine the fluidic resistance of an incoming flow 171.

The above description illustrates various embodiments of the present fluidic resistors for providing steady reactant flow in a flow controller attached to a fuel cell. Other fluidic resistor configurations are also within the scope of the present invention, which is to provide a fluidic resistance to the flow to the fuel cell. The dimensions of the fluidic resistors are designed to restrict a liquid flow, and/or to provide a steady flow to the fuel cell. The materials of the fluidic resistors are selected to be compatible with the fuel cell reactant fluids, such as resistance to nitric acid or sulfuric acid. The configurations of the fluidic resistors are designed to provide ease of fabrication and reproducibility.

In an embodiment, the present invention discloses an integrated fuel cell system for delivery of liquid fuels through use of microscaled encapsulated fluidic ports. The integrated fuel cell system comprises a flow controller integrated directly with an electrode of the fuel cell where the resistance of the flow controller can be managed through the use of integrated microchannels adjacent to the fuel cell. For example, each fuel cell comprises an anode/cathode pair and a flow controller having fluidic layers used to redirect either the catholyte, the anolyte, or both catholyte and anolyte. In an embodiment, the fuel cell system only comprises a flow management for the cathode reactant flow. In another embodiment, the fuel cell system only comprises flow management for the anode reactant flow. In yet another embodiment, the fuel cell system comprises flow management for both cathode and anode reactant flows, either by two separate fluidic layers (where each layer delivers one reactant flowstream) or by one fluidic layer (where the layer comprises two separate microchannel structures with each microchannel structure delivering one reactant flowstream).

Figure 8:
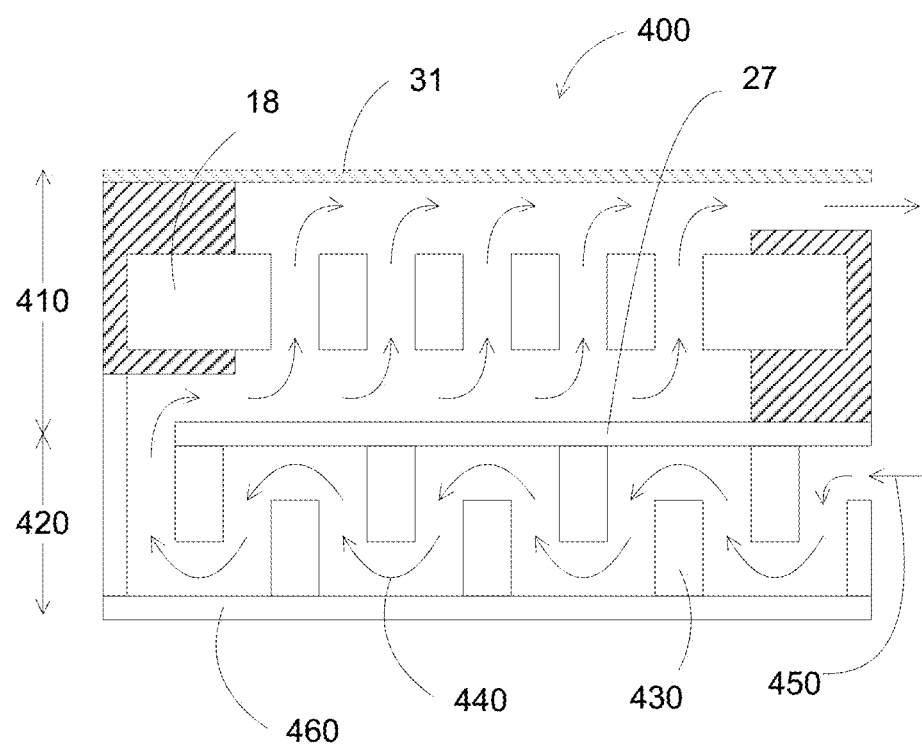
FIG. 8 illustrates an exemplary integrated fuel cell system with an integrated flow management according to an embodiment of the present invention.

FIG. 8 illustrates a portion of an exemplary integrated fuel cell system 400 with integrated flow management according to an embodiment of the present invention. The integrated fuel cell system 400 shows one electrode layer 410 (e.g., a cathode electrode 18) and a flow controller layer 420 integrated together. The other half of the fuel cell, e.g., the anode electrode, is not shown. As shown, the flow controller 420 comprises a serpentine pattern 430, directing the entrance reactant flow 450 to a tortuous path 440. Also shown is an optional outer cap layer 460 capping the serpentine pattern, and an inner cap layer 27 which is the cap layer for the fuel cell electrode chamber. The cap layers are optional, for example, the outer cap layer 460 can be accomplished by a cap layer of the adjacent fuel cell. In an embodiment, the dimensions and configurations of the flow controller 420 are designed to achieve a desired fluid resistance, matching the resistance of the fuel cell electrode 410 to achieve an improved flow through the electrode. For example, the flow controller is designed for managing fluid flow, including channel length optimization to provide acceptable pressure drops and flow rates with the fluidic resistance of the flow controller being a function of fluid channel path length, height, and width. In an embodiment, the resistance of the flow controller pattern is about 10 to 30 times the resistance of the electrode, characterized by the geometry and material of the fuel cell.

In an embodiment, the flow controller layer can have embossed flow channels, which create a preferential flow path upon which the fluid will travel before reaching the electrode portion. For example, the flow channel can be in a serpentine pattern, spiral pattern or a lattice layout. In addition, obstruction members can be incorporated, extending from the channel walls into the flow channels, partially blocking the channels to restrict the flow of reactant gas into the channels, increasing the resistance of the flow controller to a desired value. The channels can have rectangular shape or rounded shape. The channel walls can be angled relative to one another to provide a taper in the channels rather than a relatively uniform channel width. It should be understood that many other geometric patterns may be formed as flow channels in the flow controller layer, while remaining within the scope of the present invention. The invention may also be used where a stack or other assembly containing more than one fuel cell is connected.

Figure 9A:
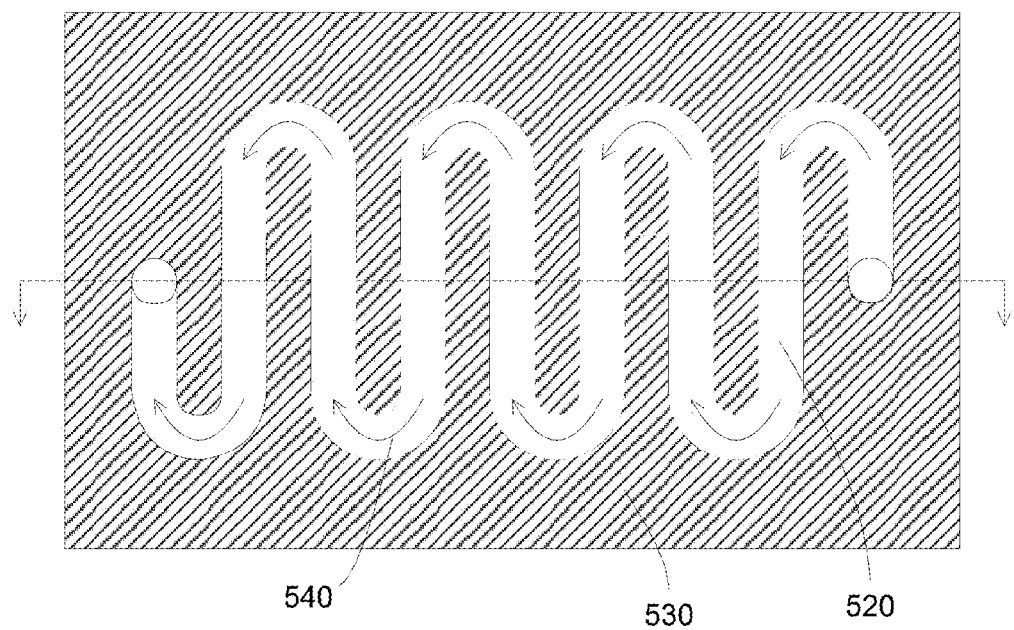
FIGS. 9A-9C illustrate various views of an exemplary serpentine pattern.
Figure 9B:
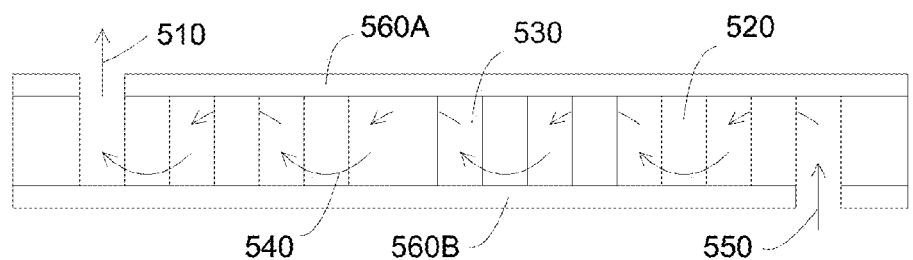

FIGS. 9A and 9B illustrate a top view and a cross section, respectively, of an exemplary serpentine pattern 520 for the flow controller layer 530 where the flow channels can compensate for the buildup of pressure in the fuel cell electrode. A serpentine pattern 520 is formed throughout the flow controller layer 530 to create a channel for the reactant flow, which enters 550 at one end and exits 510 at another end. The flow controller layer can be connected to an inlet of an electrode chamber to provide regulated flow 510 to the electrode chamber. Alternatively, the flow controller layer can be connected to an outlet of an electrode chamber to accept the flow 550 from the electrode chamber.

Cap layers 560A and 560B are shown for capping the serpentine pattern 520 and confining the reactant flow 540. The cap layers are optional and the serpentine pattern 520 can use the cap layers of the electrode chambers instead of providing additional layers.

Figure 9C:
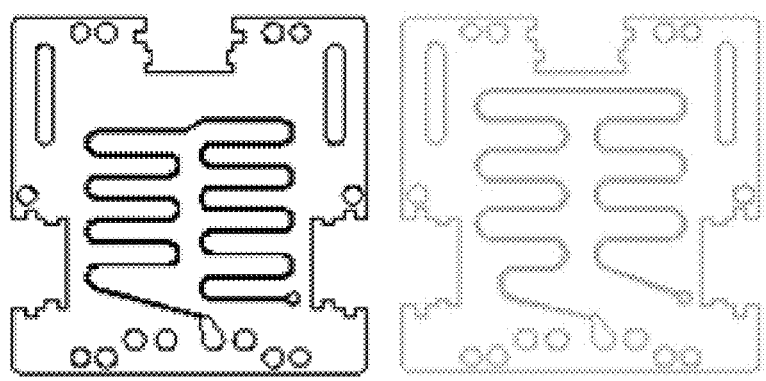

FIG. 9C illustrates two exemplary flow controller layers according to embodiments of the present invention. The reactant runs a serpentine pattern within the flow controller layer, and enters and exits the layer through connection holes.

In an embodiment, the design of the individual layers for microfluidic channel integration includes consideration of reliability, manufacturability, materials compatibility, size, cell performance and cost with improved manufacturing processes such as tighter control of serpentine geometry, separate features to reduce leak paths, repetition, etc. Maintaining a minimal form factor is also a desirable consideration in designing fuel cells having integrated flow controllers.

In addition, in an embodiment, the fuel cell and the flow controller chambers are sealed hermetically in order to allow safe and comfortable use, transportation and storage of the fuel cell in any orientation. For example, components are manufactured by stamping core components and sealing them with automated epoxy dispense and screen printing techniques followed by pressing the components. In addition integrated microchannels may be manufactured with standard MEMS fabrication techniques such as surface and bulk micromachining techniques (i.e. masking, fusion bonding or other, deposition, and etching by dry or wet techniques). Other methods can be used, such as a compression molding process or machining process. The materials are selected to address highly corrosive (acidic) environments, such as Polyvinylidene Fluoride, (PVDF) and Pelseal 2112™ (a fluorinated epoxy).

Figure 10:
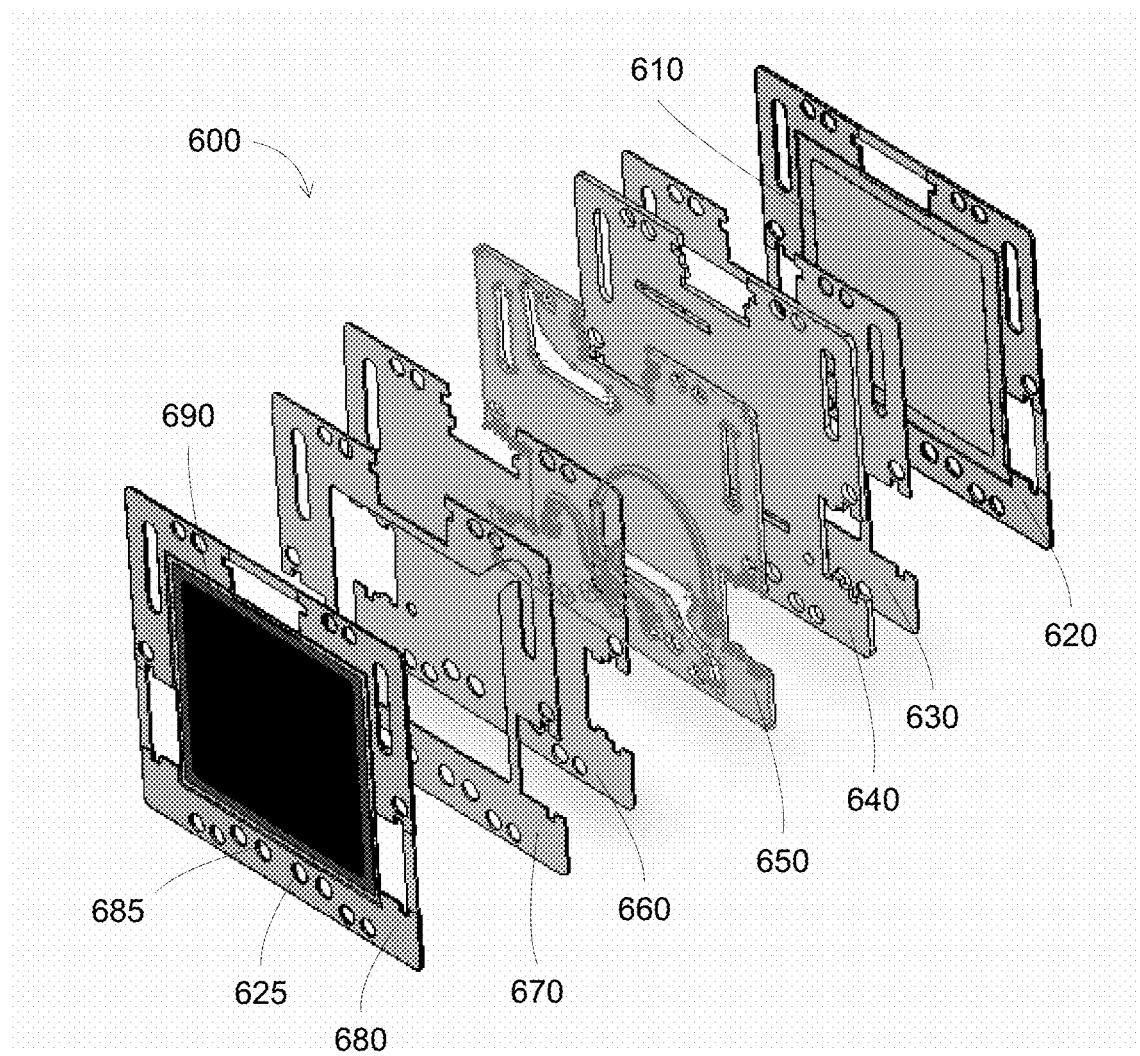
FIG. 10 illustrates an exemplary integrated fuel cell system comprising a plurality of flow managements integrated with a plurality of anode/cathode pairs.

FIG. 10 illustrates a portion of an exemplary integrated fuel cell system 600 comprising a plurality of flow management configurations integrated with a plurality of anode/cathode pairs, arranged in an alternating anode/cathode/anode/cathode/ . . . configuration. The illustrated portion shows a flow management microchannel layer 1050 sandwiched between a cathode frame 620/cathode 610 and an anode frame 680/anode 690. In addition to the electrodes, the fuel cell system also comprises fluid chambers 630/670 and encapsulant layers 640/660 for the cathode 610 and anode 690, respectively. The layers also comprise multiple ports 625/685 for anolyte and catholyte inlets and outlets. In this configuration, the microchannel layer 650 employs the encapsulant layers 640/660 of the cathode and anode reaction chambers for capping the microchannel layer 650.

The microchannel layer 650 can deliver one or two reactant flows to one (either the anode or the cathode) or two electrodes (both anode and cathode). For example, in an embodiment, if the fuel cell system 600 only uses one regulated reactant flow for one electrode chamber (with the other electrode chamber using unregulated reactant flow), then the microchannel layer 650 can comprise one microchannel structure for delivering regulated reactant flow to the electrode requiring regulated flow.

In another embodiment, the microchannel layer 650 comprises two separate microchannel structures within one layer, one for transporting the anolyte reactant and one for transporting the catholyte reactant. The anolyte enters a first microchannel structure before reaching the anolyte fluid chamber 680. Similarly, the catholyte enters a second microchannel structure before reaching the catholyte fluid chamber 630.

In another embodiment, the fuel cell system 600 has two separate microchannel layers (only one layer shown), one for transporting the anolyte and one for transporting the catholyte.

In an embodiment, the integrated fuel cell system can have multiple anode/cathode pairs arranged in a different configurations, such as alternating . . . anode/cathode-anode/cathode . . . or alternating . . . cathode/cathode-anode/anode . . . , each with different flow controller configurations.

Figure 11A:
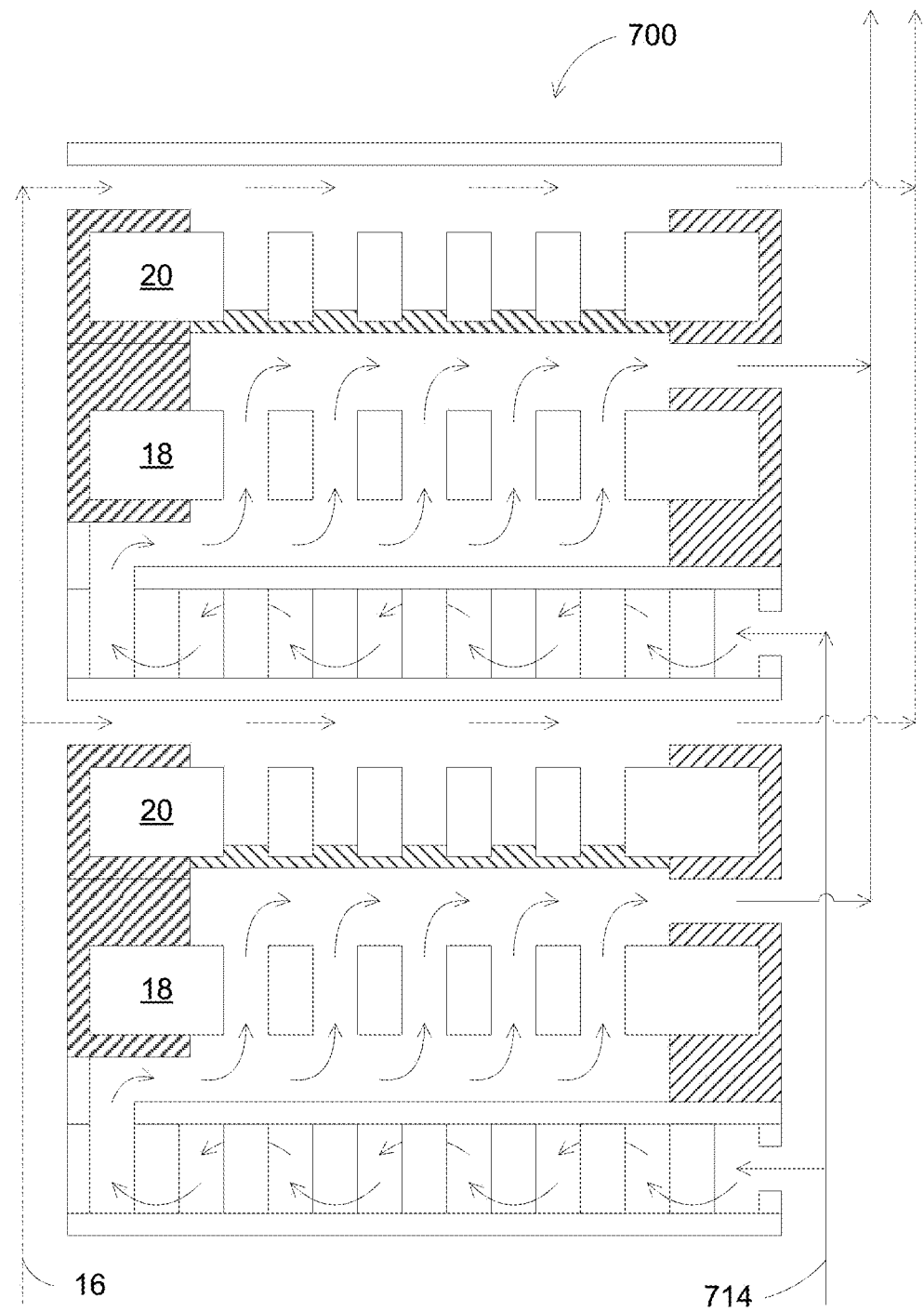
FIGS. 11A-11C illustrates various configurations for flow controller having microchannel layer integrated with a fuel cell stack having 4 electrodes arranged in anode-cathode/anode-cathode configuration.
Figure 11B:
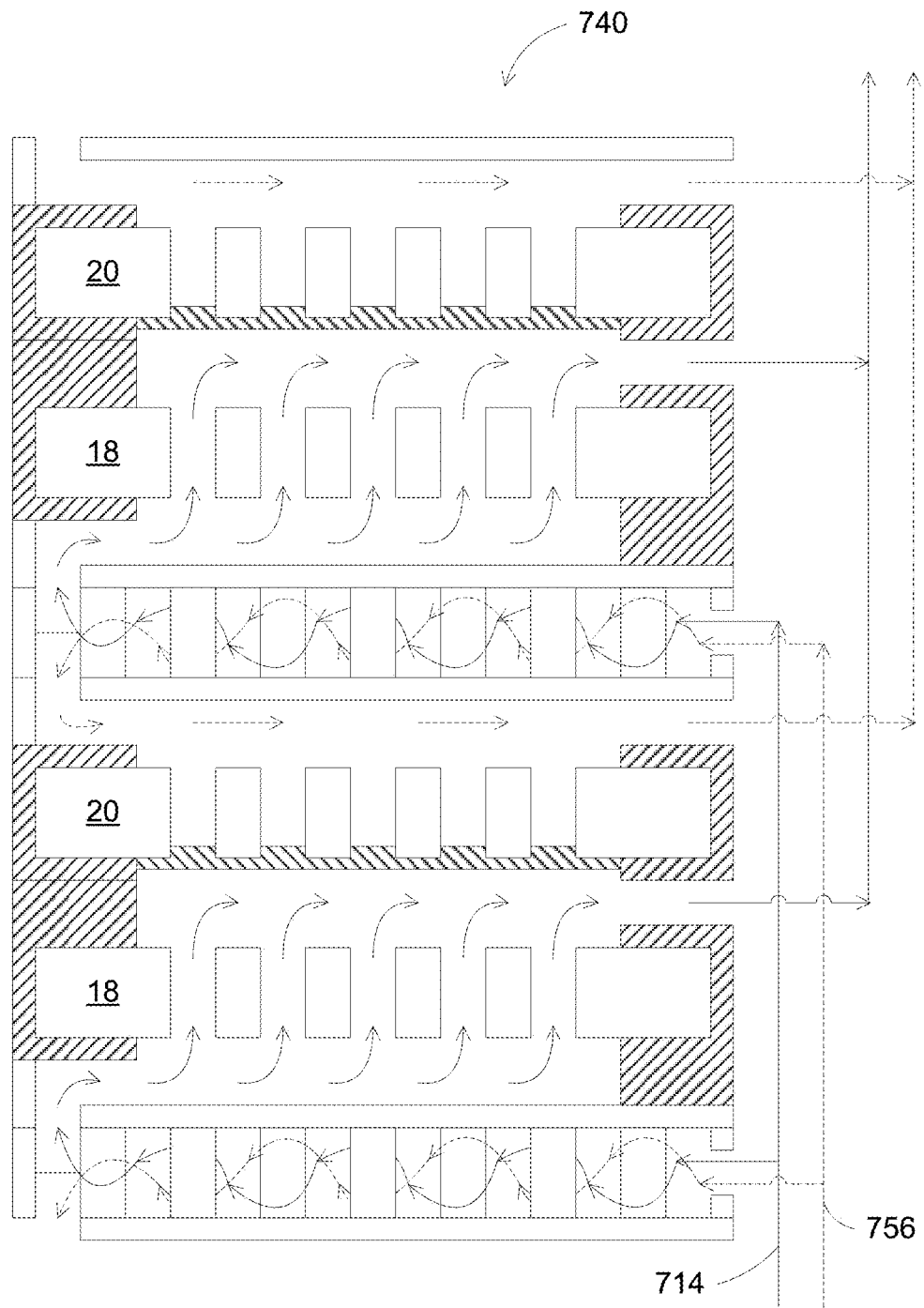
Figure 11C:
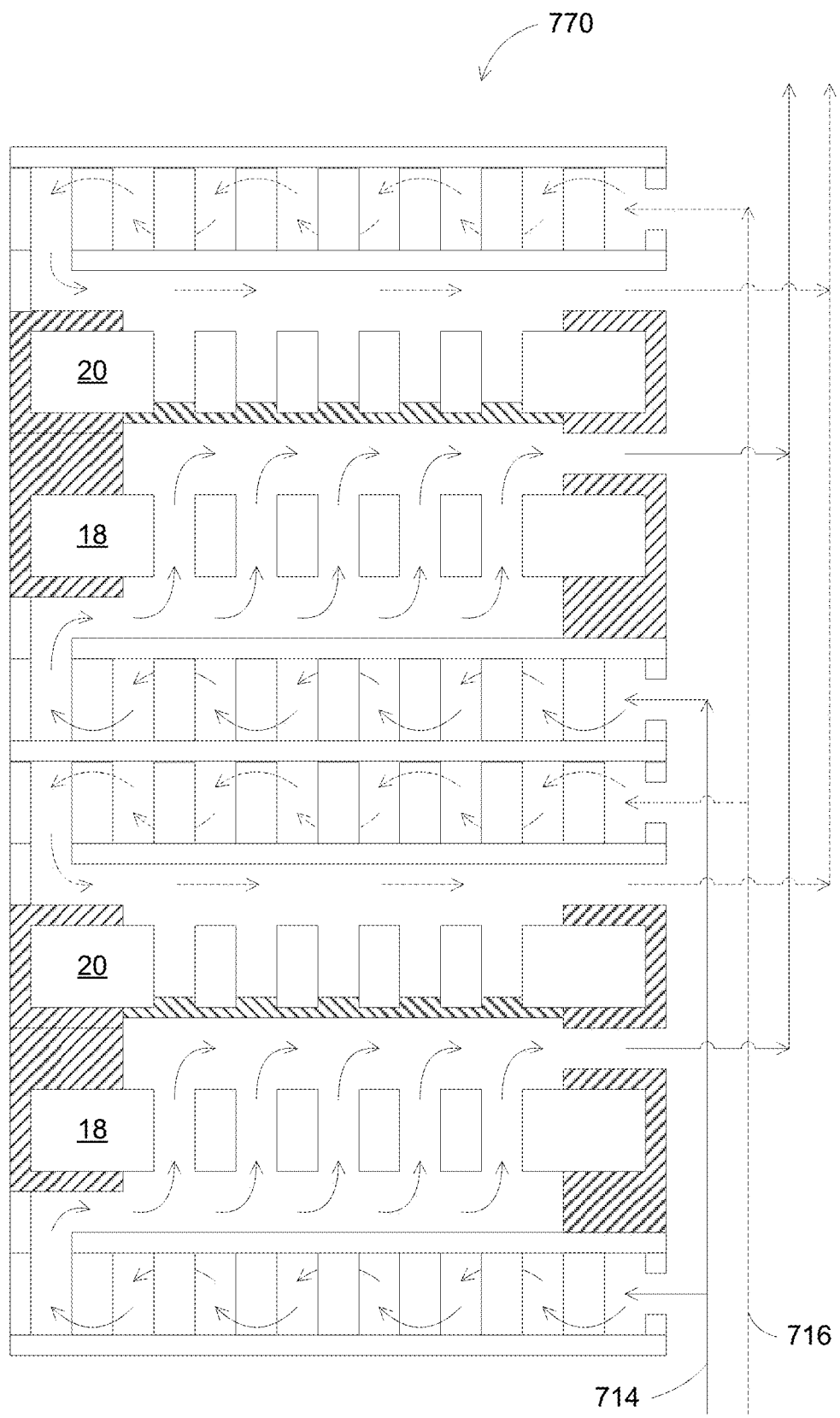

FIGS. 11A-11C illustrate various configurations for flow controller having microchannel layer integrated with a fuel cell stack having 4 electrodes arranged in anode-cathode/anode-cathode configuration.

FIG. 11A illustrates an exemplary integrated fuel cell stack 700 having a microchannel layer delivering steady catholyte reactant to the cathodes. The catholyte 714 is delivered to the microchannel layers, passing through the serpentine pattern before reaching each cathode 18. In contrast, the anolyte 16 enters each anode chamber undisturbed. In this configuration, one microchannel layer having one serpentine pattern is used for each fuel cell (each anode-cathode pair). Alternatively, the same configuration can be used to deliver steady anolyte reactant flow to each anode 20, and deliver un-disturbed catholyte reactant flow to each cathode 18.

FIG. 11B illustrates an exemplary integrated fuel cell stack 740 having a microchannel layer delivering steady catholyte reactant to the cathodes and steady anolyte reactant to the anodes. The catholyte 714 is delivered to the microchannel layers, passing through a first serpentine pattern before reaching each cathode 18. Similarly, the anolyte 756 is delivered to the microchannel layers, passing through a second serpentine pattern before reaching each anode 20. In this configuration, one microchannel layer having two embedded serpentine patterns is used for each fuel cell (each anode-cathode pair).

FIG. 11C illustrates an exemplary integrated fuel cell stack 770 having two microchannel layers with one delivering steady catholyte reactant to the cathodes and the other delivering steady anolyte reactant to the anodes. The catholyte 714 is delivered to a first microchannel layer, passing through a serpentine pattern before reaching each cathode 18. Similarly, the anolyte 716 is delivered to a second microchannel layer, passing through a serpentine pattern before reaching each anode 20. In this configuration, one microchannel layer having one serpentine pattern is used for each electrode and two microchannel layers used for each fuel cell (each anode-cathode pair).

Figure 12A:
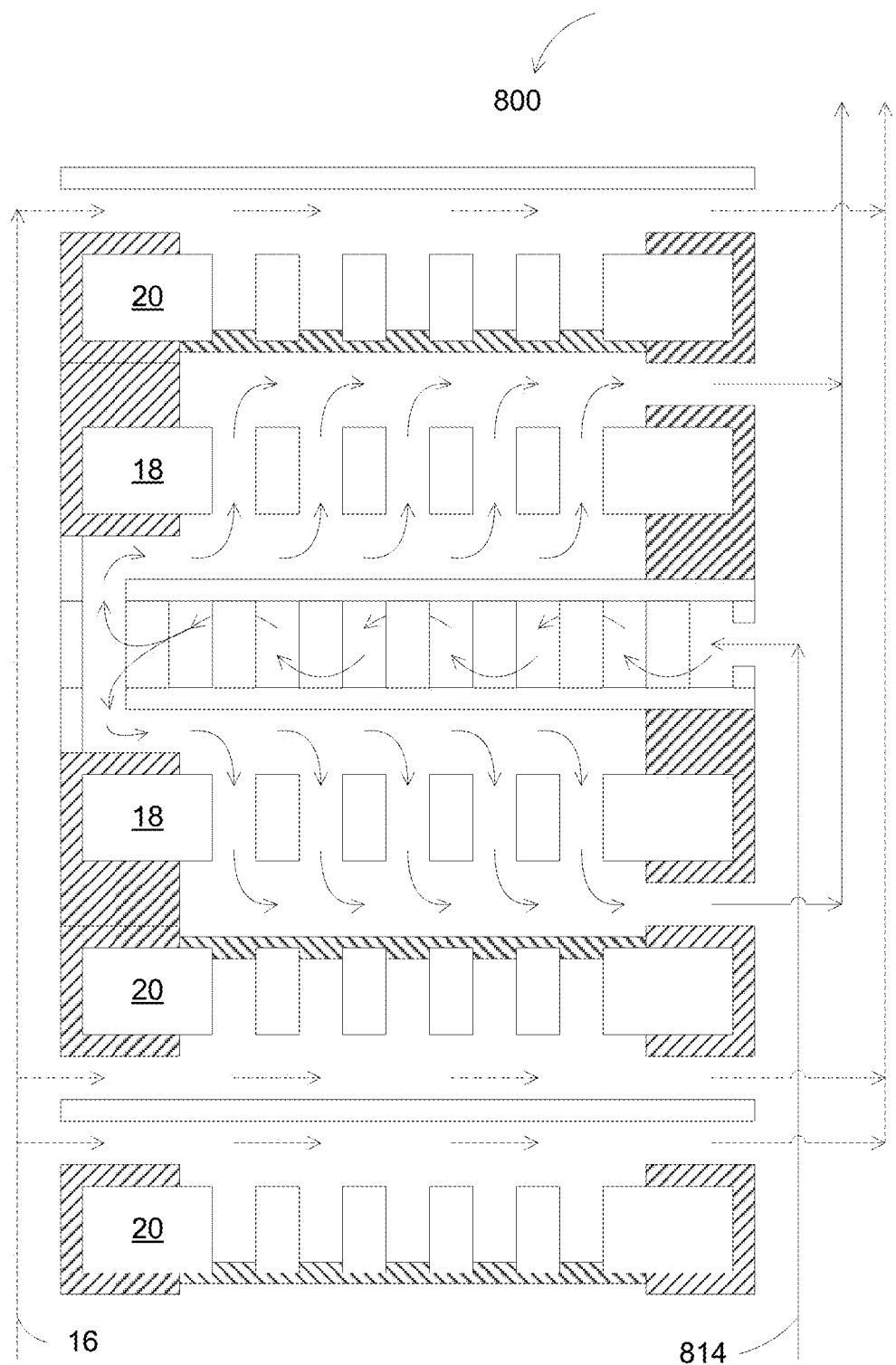
FIGS. 12A-12B illustrates various configurations for flow controller having microchannel layer integrated with a fuel cell stack having 5 electrodes arranged in anode-cathode/cathode-anode/anode configuration.
Figure 12B:
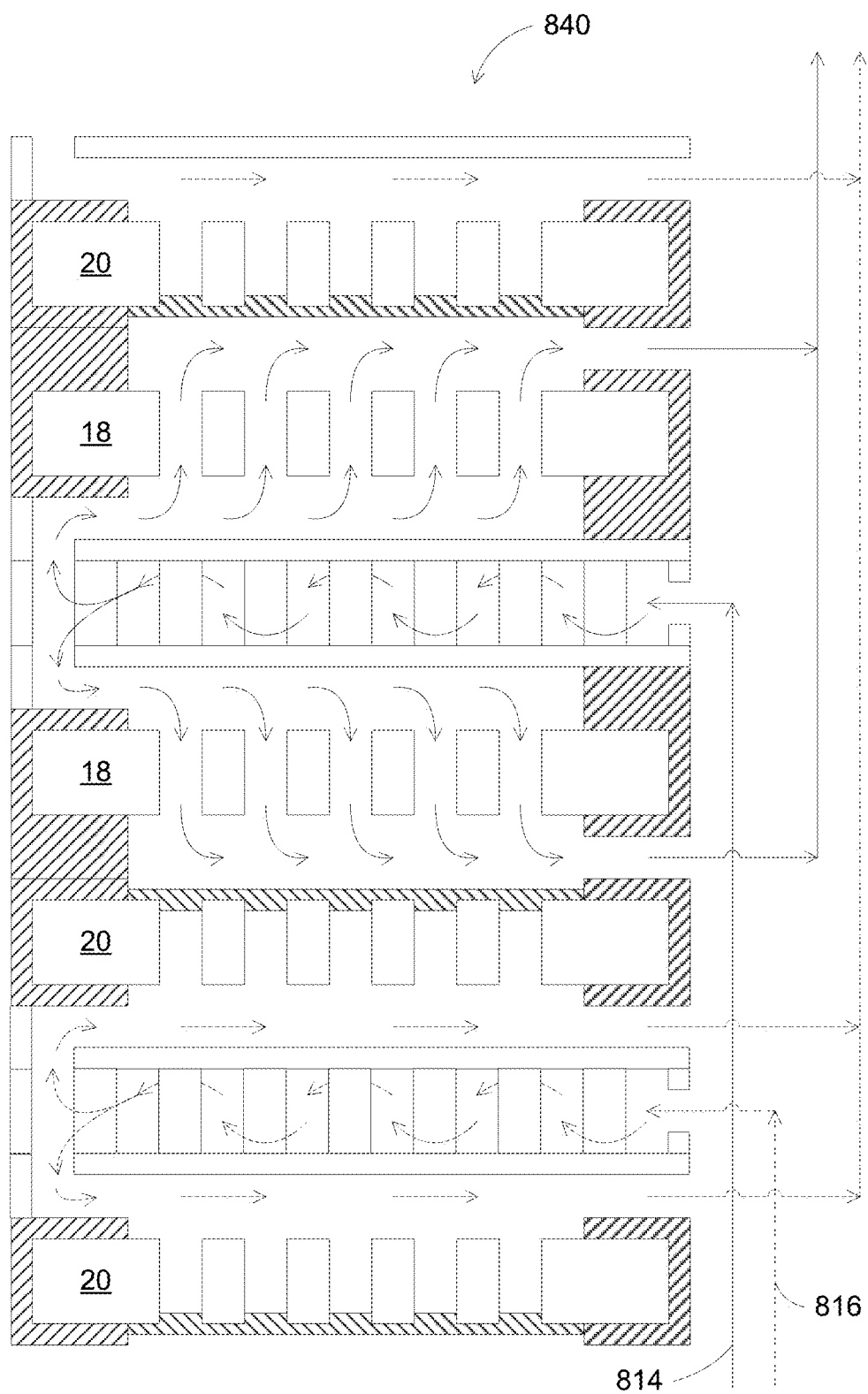

FIGS. 12A-12B illustrate various configurations for flow controller having microchannel layer integrated with a fuel cell stack having 5 electrodes arranged in anode-cathode/cathode-anode/anode configuration.

FIG. 12A illustrates an exemplary integrated fuel cell stack 800 having a microchannel layer delivering steady catholyte reactant to the cathodes. The catholyte 814 is delivered to the microchannel layers, passing through the serpentine pattern before reaching two adjacent cathodes 18. In contrast, the anolyte 16 enters each anode chamber undisturbed. In this configuration, one microchannel layer having one serpentine pattern is used for two adjacent fuel cells (two anode-cathode pairs). Alternatively, the same configuration can be used to deliver steady anolyte reactant flow to two adjacent anodes 20, and deliver un-disturbed catholyte reactant flow to each cathode 18.

FIG. 12B illustrates an exemplary integrated fuel cell stack 840 having microchannel layers delivering steady catholyte reactant to the cathodes and steady anolyte reactant to the anodes. The catholyte 814 is delivered to the microchannel layers, passing through the serpentine pattern before reaching two adjacent cathodes 18. Similarly, the anolyte 816 is delivered to the microchannel layers, passing through the serpentine pattern before reaching two adjacent anodes 18. In this configuration, two microchannel layers each having one serpentine pattern are used for two adjacent fuel cells (two anode-cathode pairs).

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A fuel cell, comprising:
    a first electrode configured to receive a first fluid electrode flowstream;
    a fluidic resistor coupled to the first fluid electrode flowstream providing steadier flow to the first electrode against a pressure fluctuation at the first electrode area,
    wherein the fluidic resistor comprises a fluidic conduit having a constant fluidic resistance which is higher than the fluidic resistance across the first electrode;
    wherein the fluidic conduit comprises a conduit having a winding pattern; and
    wherein the constant fluidic resistance is between 5 and 10 times higher than the fluidic resistance across the first electrode.

2. The fuel cell as in claim 1, further comprising:
    wherein the fluidic conduit comprises a conduit comprising a capillary tube.

3. The fuel cell as in claim 2, further comprising:
    wherein the capillary tube is coated with a surface tension reduction coating.

4. The fuel cell as in claim 1, further comprising:
wherein the pressure drop across the fuel cell is between 0 and 1 psi, and the pressure drop across the fluidic resistor is between 5 and 15 psi.

5. The fuel cell as in claim 1, further comprising:
wherein the fluidic resistor is disposed within a flow management, wherein the flow management comprises another fluidic resistor which is coupled to another fluid electrode flow stream.

6. The fuel cell as in claim 1, further comprising:
a second electrode configured to receive a second fluid electrode flowstream; and
a second fluidic resistor coupled to the second fluid electrode flowstream, wherein the second fluidic resistor comprises a fluidic conduit having a constant second fluidic resistance which is higher than the fluidic resistance across the second electrode.

7. The fuel cell as in claim 1, further comprising:
a porous plug disposed within the fluidic conduit of the fluidic resistor.

8. The fuel cell as in claim 7, further comprising:
wherein the porous plug comprises of $SiO_2$ glass wool.

9. The fuel cell as in claim 7, further comprising:
wherein the porous plug comprises a hydrophilic material.

10. The fuel cell as in claim 7, further comprising:
wherein the porous plug comprises of a material resistant to at least one of a nitric acid and a sulfuric acid.

11. The fuel cell as in claim 1, further comprising:
wherein the fluidic resistor comprises a single inlet and a single outlet.

12. The fuel cell as in claim 1, further comprising:
a porous disk comprising micro machined pores disposed within the fluidic conduit of the fluidic resistor.

13. The fuel cell as in claim 12, further comprising:
wherein the porous disk comprises of a hydrophilic material.

14. The fuel cell as in claim 12, further comprising:
wherein the porous disk comprises of at least one of a $SiO_2$, Ta, Carbon, polyvinylidene fluoride (PVDF), high-density polyethylene (HDPE), and a Teflon.

15. The fuel cell as in claim 2, further comprising:
wherein the capillary tube comprises of at least one of a polyvinylidene fluoride (PVDF), high-density polyethylene (HDPE), and a Teflon.

16. The fuel cell as in claim 2, further comprising:
wherein the capillary tube comprises of fluorine-silicone based polymer.

17. The fuel cell as in claim 1, further comprising:
wherein the first electrode is coated with a bubble repelling surface.

18. The fuel cell as in claim 1, further comprising:
wherein the first electrode is coated with a hydrophilic microporous layer.

* * * * *